(12) United States Patent
Wu et al.

(10) Patent No.: US 8,511,882 B2
(45) Date of Patent: Aug. 20, 2013

(54) LIGHT GUIDE PLATE ASSEMBLY

(75) Inventors: Yu-Chang Wu, Hsin-Chu (TW); Hsin-Wu Lin, Hsin-Chu (TW); Po-Iem Lin, Hsin-Chu (TW); Shau-Yu Tsai, Hsin-Chu (TW); Hsiu-Mei Fang, Hsin-Chu (TW); Chun-Chang Hung, Hsin-Chu (TW); Chiu Chun Chen, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 607 days.

(21) Appl. No.: 12/720,202

(22) Filed: Mar. 9, 2010

(65) Prior Publication Data

US 2010/0232178 A1    Sep. 16, 2010

(30) Foreign Application Priority Data

Mar. 10, 2009    (TW) .................................. 98107619 A

(51) Int. Cl.
    *F21V 7/04*    (2006.01)
(52) U.S. Cl.
    USPC .......................................... 362/616; 362/628
(58) Field of Classification Search
    USPC ................ 362/616, 612, 628, 608, 606, 607, 362/600, 615; 385/146, 129, 901
    See application file for complete search history.

(56) References Cited

U.S. PATENT DOCUMENTS

| | | | |
|---|---|---|---|
| 4,765,080 A * | 8/1988 | Conti ............................... 40/576 |
| 5,779,339 A * | 7/1998 | Konishi et al. ................. 362/606 |
| 6,241,358 B1 | 6/2001 | Higuchi et al. |
| 6,412,969 B1 * | 7/2002 | Torihara et al. ............... 362/609 |
| 6,908,205 B2 * | 6/2005 | Greiner ......................... 362/617 |
| 7,490,963 B2 * | 2/2009 | Fang et al. .................... 362/330 |
| 7,490,964 B2 * | 2/2009 | Haddad et al. ................ 362/431 |
| 8,092,066 B2 * | 1/2012 | Higuchi ........................ 362/616 |
| 8,408,777 B2 * | 4/2013 | Kuwayama et al. .......... 362/616 |
| 2006/0125979 A1 * | 6/2006 | Fang et al. ...................... 349/98 |

FOREIGN PATENT DOCUMENTS

| | | |
|---|---|---|
| EP | 1918768 A2 | 5/2008 |
| JP | 2006286638 | 10/2006 |
| JP | 2007194119 | 8/2007 |
| TW | 200726561 | 9/1995 |
| TW | I271587 | 1/2007 |
| TW | I276076 | 3/2007 |
| TW | 200808530 | 2/2008 |
| TW | I300022 | 8/2008 |

OTHER PUBLICATIONS

English language translation of abstract of TW I271587.
English language translation of abstract of TW 200808530.

(Continued)

*Primary Examiner* — Bao Q Truong

(74) *Attorney, Agent, or Firm* — McClure, Qualey & Rodack, LLP

(57) ABSTRACT

A light guide plate assembly for a backlight module is provided. The light guide plate assembly includes a plurality of light guide plates. Each light guide plate has a top face, at least one side face, and at least one connecting part. The connecting part is formed on the side face of the light guide plate. The connecting part has a connecting face, wherein the adjacent connecting faces are connected to each other. The top faces of the plurality of light guide plates are coplanar. A distance between the connecting face and the top face is ⅓ to 1/20 of the thickness of the light guide plate.

22 Claims, 6 Drawing Sheets

(56) References Cited

OTHER PUBLICATIONS

English language translation of abstract of TW I300022.
English language translation of abstract of TW 200726561.
English language translation of abstract of TW I276076.
English language translation of abstract of JP 2007194119 (published Aug. 2, 2007).
English language translation of abstract of JP 2006286638 (published Oct. 19, 2006).
Chinese language office action dated Jun. 13, 2009.

* cited by examiner

LIGHT GUIDE PLATE ASSEMBLY

BACKGROUND OF THE INVENTION

1. Field of the Invention

This invention generally relates to a light guide plate assembly. More particularly, this invention relates to a light guide plate assembly for a backlight module.

2. Description of the Prior Art

Recently, liquid crystal displays are widely used in many display devices such as televisions, computers, laptops, monitors, cell phones, digital cameras, etc. A backlight module provides the liquid crystal display with a uniform light of sufficient brightness, so that the liquid crystal display can display images normally. In general, a light guide plate used in the backlight module directly influences the performance and the assembly cost of the backlight module.

For an edge type backlight module, the light enters from an edge and is transferred by the light guide plate, which exhibits the advantage of thinner thickness. However, due to the restricted amount of light source, the brightness cannot be significantly increased and a local dimming cannot be performed on the images. Therefore, a conventional backlight module 90 with multiple light guide plates 80 shown in FIG. 1 has superiority in thickness and image contrast. However, since the backlight module has multiple light guide plates, in consideration of the manufacture variation of individual light guide plate, the assembly tolerance, and temperature difference, it is possible to form a non-uniform distribution of light caused by bright or dark bands in gaps between the light guide plates. Hence, how to overcome the non-uniform distribution of light is an important issue for the edge type backlight module.

On the other hand, for a direct type backlight module, optical plates including the light guide plate used therein are generally designed to be lager than the display area, so that abnormal regions caused by significant difference between bright and dark areas and non-uniform brightness occurred when the optical plates are too small to meet the requirements of the display can be prevented. However, larger optical plates result in higher expenses on molding tools and higher manufacture cost, which has no economic benefit.

SUMMARY OF THE INVENTION

It is an object of the present invention to provide a light guide plate assembly for a backlight module to increase the color uniformity.

It is another object of the present invention to provide a light guide plate assembly for a backlight module to increase the brightness.

The present invention provides a light guide plate assembly for a backlight module. The light guide plate assembly includes a plurality of light guide plates. Each light guide plate has a top face, at least one side face, and at least one connecting part. The connecting part is formed on the side face of the light guide plate. The connecting part has a connecting face, wherein the adjacent connecting faces are connected to each other. The top faces of the plurality of light guide plates are coplanar. A distance between the connecting face and the top face is ⅓ to 1/20 of the thickness of the light guide plate. The connecting face is parallel to the top face.

At least one of the light guide plates further includes an upper connecting part and a lower connecting part. An upper face of the upper connecting part and the top face are coplanar. A lower face of the lower connecting part and a bottom face of the light guide plate are coplanar. The connecting face of the upper connecting part is larger than the connecting face of the lower connecting part. The lower connecting part and the side face of the adjacent light guide plates together form a light source space. A light reflecting sheet can be disposed on the connecting face of the upper connecting part. A light absorbing sheet can be disposed on the connecting face of the upper connecting part. A plurality of V-cut grooves can be disposed on the connecting face of the upper connecting part.

In another embodiment, the lower face of the lower connecting part and the bottom face are parallel to each other with a distance therebetween. The connecting face of the lower connecting part is larger than the lower face. The lower connecting part and the side face of the adjacent light guide plates together form a light source space. A distance between the upper face and the lower face is ⅓ to 1/20 of the thickness of the light guide plate. A light reflecting sheet can be disposed on the connecting face. A light absorbing sheet can be disposed on the connecting face. A plurality of V-cut grooves can be disposed on the connecting face of the upper connecting part.

DETAILED DESCRIPTION OF THE PREFERRED EMBODIMENT

Figure 1:
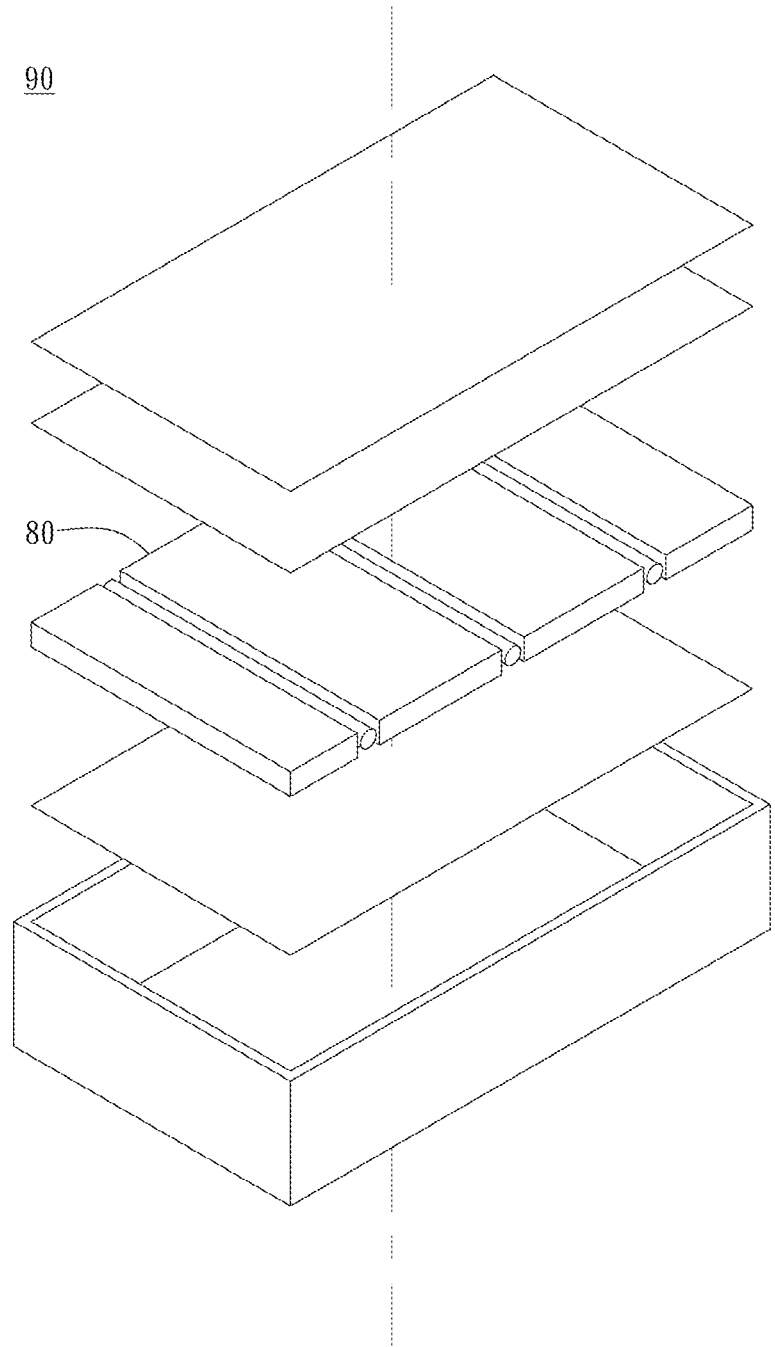
FIG. 1 is a schematic view of a conventional backlight module with multiple light guide plates.

The present invention provides a light guide plate assembly for a backlight module. As shown in FIG. 2B, a light guide plate assembly 800 and a light source 700 together form a backlight module 900. The light source 700 can be selected from light emitting diodes, cold cathode fluorescent lamps, etc. The light guide plate assembly includes a plurality of light guide plates, wherein each light guide plate has a top face, at least one side face, and at least one connecting part, In the embodiment shown in FIG. 2A, the light guide plate assembly 800 includes a first light guide plate 100 and a second light guide plate 200. However, in other embodiments, the light guide plate assembly 800 may include more than two light guide plates. The first light guide plate 100 has a first top face 100*a*, a first side face 100*b* adjacent to the first top face 100*a*, and a first connecting part 106. The second light guide plate 200 has a second top face 200*a*, a second side face 200*b* adjacent to the second top face 200*a*, and a second connecting part 206. More particularly, the first connecting part 106 is formed on the first side face 100*b* of the first light guide plate 100. The first connecting part 106 has a first connecting face 106*x*. The second connecting part 206 is formed on the second side face 200*b* of the second light guide plate 200. The second connecting part 206 has a second connecting face 206x. The first connecting face 106x and the second connecting face 206x are connected to each other. The first top face 100a and the second top face 200a are coplanar. A distance between the second connecting face 206x and the second top face 200a is ⅓ to ¹⁄₂₀ of the thickness of the second light guide plate 200. Each connecting face is preferably parallel to the respective top face.

Figure 2A:
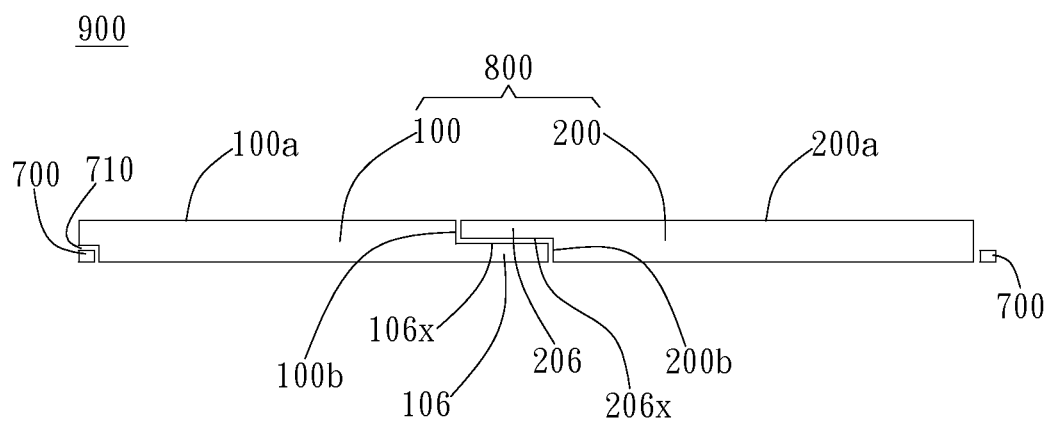
FIG. 2A is a schematic view of one embodiment of the present invention.
Figure 2B:
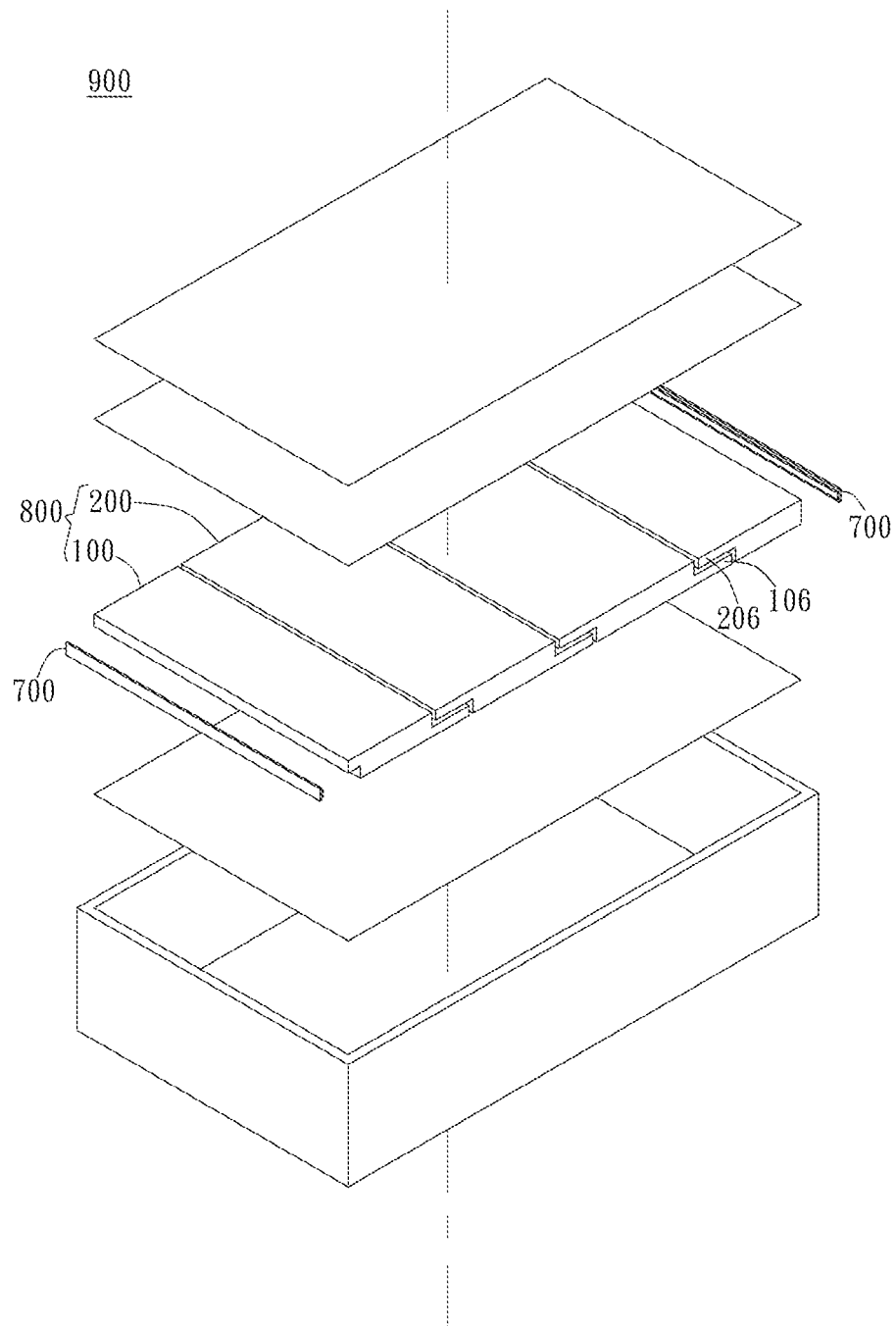
FIG. 2B is a three-dimensional view of one embodiment of the present invention.

In other words, in the embodiment shown in FIG. 2A, an upper edge of one end of the first light guide plate 100 is recessed to form the first connecting part 106. The second light guide plate 200 is disposed on one side of the first light guide plate 100 corresponding to the first connecting part 106. An upper edge of one end of the second light guide plate 200 corresponding to the first connecting part 106 extends to form the second connecting part 206. The second connecting part 206 extends from the second light guide plate 200 towards the first light guide plate 100 to cover the first connecting part 106. More particularly, as shown in FIG. 2B, the first light guide plate 100 and the second light guide plate 200 are disposed side by side, wherein their top faces are coplanar. The first connecting part 106 is a flange on the side of the first light guide plate 100 having a step height with respect to the first top face 100a. The second connecting part 206 is a flange on one side of the second light guide plate 200 facing the first light guide plate 100 and extending from the second top face 200a of the second light guide plate 200 towards the first light guide plate 100. The thickness of the second connecting part 206 is preferably ⅓ to ¹⁄₂₀ of the thickness of the second light guide plate 200.

Figure 2C:
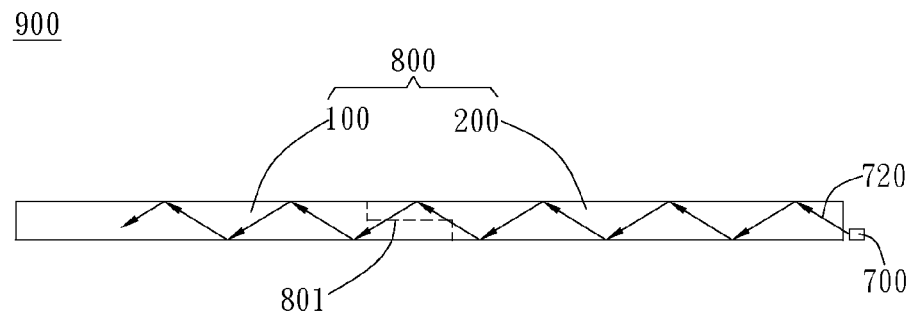
FIG. 2C is a schematic view showing the light path in the light guide plates after assembled.

By means of the first connecting part 106 and the corresponding second connecting part 206, the first light guide plate 100 and the second light guide plate 200 can be collocated together. Besides, the collocated first light guide plate 100 and second light guide plate 200 can be connected together to form a light guide plate with larger area by using an UV curable adhesive, laser melting, ultrasonic melting, etc. As shown in FIG. 2C, the light 720 emitted by the light source 700 transmits in the light guide plate assembly 800 formed by the first light guide plate 100 and the second light guide plate 200 and passes the interface 801 of the first light guide plate 100 and the second light guide plate 200. As shown in FIG. 2A, the interface 801 is formed by the first connecting face 106x and the second connecting face 206x. In other words, a plurality of light guide plates of smaller area can be connected to form a light guide plate assembly with larger area to reduce the expenses on molding tools and the manufacturing cost of light guide plates. The above mentioned connecting manner can be applied to various types of optical plates including a diffuser plate. Moreover, optical plates with different structures can be connected to form an optical plate assembly having different structures in different regions. For example, an optical plate assembly formed by a prism plate and a plane plate can have prism structures and plane structures in different regions simultaneously.

In other embodiments, the adjacent light guide plates can be connected to each other by different structures. In the embodiment shown in FIG. 3, the second light guide plate 200 further includes a second upper connecting part 2062 and a second lower connecting part 2064. An upper face 2062a of the second upper connecting part 2062 and the second top face 200a are coplanar. A lower face 2064c of the second lower connecting part 2064 and a second bottom face 200c of the second light guide plate 200 are coplanar. More particularly, in this embodiment, the upper edge and the lower edge of one end of the first light guide plate 100 corresponding to the second light guide plate 200 are recessed to form the first connecting part 106. The upper edge and the lower edge of one end of the second light guide plate 200 corresponding to the first light guide plate 100 extend to respectively form the second upper connecting part 2062 and the second lower connecting part 2064. The second upper connecting part 2062 and the second lower connecting part 2064 together form a concave structure. By means of the first connecting part 106 and the concave structure formed by the second upper connecting part 2062 and the second lower connecting part 2064, the first light guide plate 100 and the second light guide plate 200 can be connected to each other.

Figure 3:
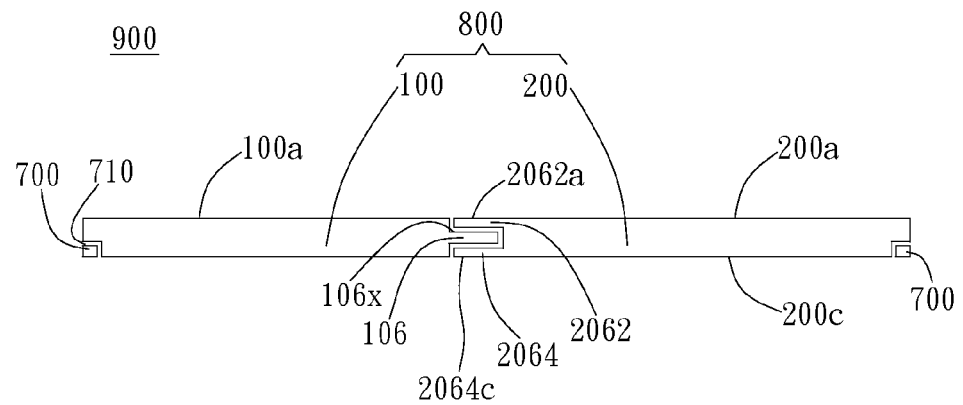
FIG. 3 is a schematic view of another embodiment of the present invention.

In the embodiments shown in FIG. 2A to FIG. 3, the light source 700 is disposed on the side of the light guide plate assembly 800 distant from the connecting parts. However, in another embodiment, the light source 700 may further be disposed between the first light guide plate 100 and the second light guide plate 200. In the embodiment shown in FIG. 4A, the second light guide plate 200 and the first light guide plate 100 respectively have the second upper connecting part 2062 and the first lower connecting part 1064. The upper face 2062a of the second upper connecting part 2062 and the second top face 200a are coplanar. The lower face 1064c of the first lower connecting part 1064 and the first bottom face 100c are coplanar. The second connecting face 206x of the second upper connecting part 2062 is larger than the first connecting face 106x of the first lower connecting part 1064. The first lower connecting part 1064 and the side face 200b of the adjacent light guide plates 100 and 200 together form a light source space 710.

Figure 4A:
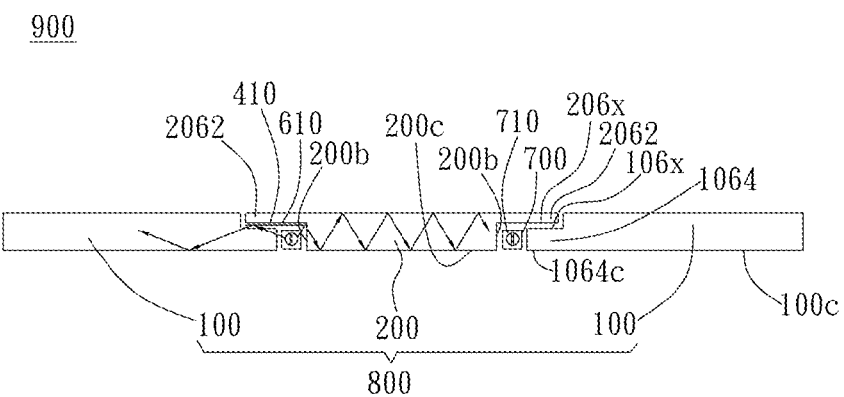
FIG. 4A is a schematic view of yet another embodiment of the present invention.

In other words, in the embodiment shown in FIG. 4A, a space exists between the first light guide plate 100 and the second light guide plate 200. The second upper connecting part 2062 extends across the space from the second light guide plate 200 towards the first light guide plate 100 to cover the first lower connecting part 1064, so that the opposing sidewalls of the first light guide plate 100 and the second light guide plate 200 together form the light source space 710 for accommodating the light source 700.

In the embodiment shown in FIG. 4A, a light reflecting sheet 610 can be disposed on a first lighting face 410 of the second upper connecting part 2062, wherein the first lighting face 410 faces the light source space 710. The light reflecting sheet 610 is configured to reduce the leak of the light emitted by the light source 700, to increase the reflection of light, to avoid the formation of dark or bright band, and to improve the optical uniformity. The light reflecting sheet 610 can include a metal coating, a metal sheet, polycarbonate, resin sheet with good reflectivity etc. In the embodiment shown in FIG. 4B, a light absorbing sheet 620 is disposed on the first lighting face 410 to absorb an excess of light to increase the uniformity of light. The light absorbing sheet 620 is preferably a black tape. Furthermore, a plurality of V-cut grooves 630 can be disposed on the first lighting face 410 to disrupt the total reflection of light emitted by the light source 700 to increase the reflection, as shown in FIG. 4C.

Figure 4B:
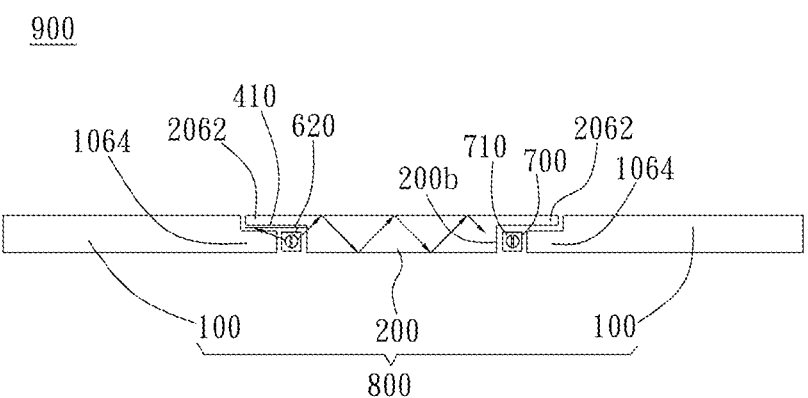
FIG. 4B is a schematic view of one embodiment of the present invention having a light absorbing sheet.
Figure 4C:
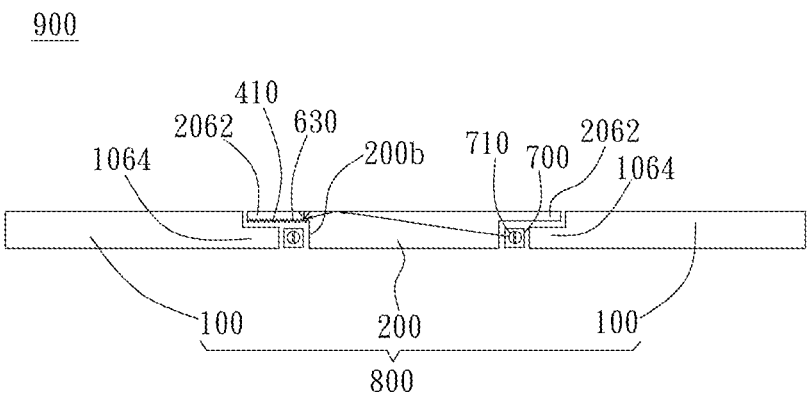
FIG. 4C is a schematic view of one embodiment of the present invention having a plurality of V-cut grooves.

More particularly, in the embodiments shown in FIG. 4A to FIG. 4C, the first light guide plate 100 and the second light guide plate 200 are assembled in one piece by connecting the second upper connecting part 2062 and the first lower connecting part 1064 to form the light guide plate assembly 800. The light source 700 can be disposed under the second upper connecting part 2062 and between the first light guide plate 100 and the second light guide plate 200. By disposing the light reflecting sheet, the light absorbing sheet, or the plurality of V-cut grooves on the first lighting face 410, the non-uniform distribution and the leak of the light emitted by the light source 700 which result from the second upper connecting part 2062 having a thickness smaller than that of the first light guide plate 100 and of the second light guide plate 200 can be prevented. Therefore, the brightness and the color uniformity of the backlight module 900 can be improved.

Figure 5:
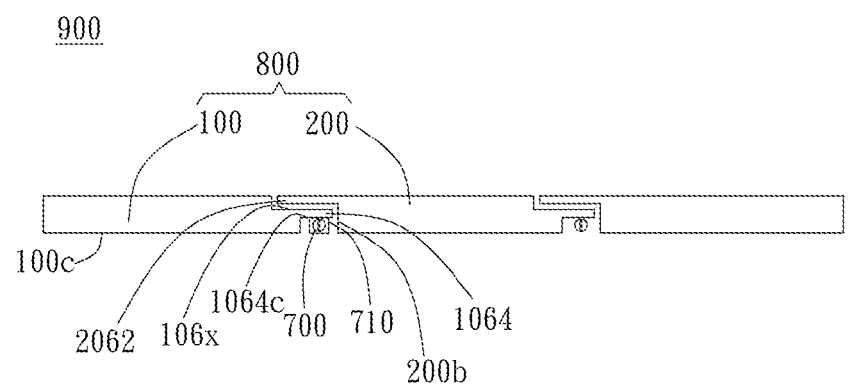
FIG. 5 is a schematic view of another embodiment of the present invention.

In different embodiments, the lower face of the lower connecting part and the bottom face of the light guide plate are parallel to each other with a distance therebetween. As shown in FIG. 5, a lower face 1064c of the first lower connecting part 1064 and the first bottom face 100c are parallel to each other. The first connecting face 106x of the first lower connecting part 1064 is larger than the lower face 1064c of the first lower connecting part 1064, wherein the first lower connecting part 1064 and the side face 200b of the second light guide plate 200 together form a light source space 710. A distance between the first connecting face 106x and the lower face 1064c of the first lower connecting part is $\frac{1}{3}$ to $\frac{1}{20}$ of the thickness of the first light guide plate 100. A light reflecting sheet, a light absorbing sheet, or a plurality of V-cut grooves can be disposed on the lower face 1064c of the first lower connecting part 1064 facing the light source space 710.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A light guide plate assembly, comprising:
   a first light guide plate having a first top face, a first side face, and a first connecting part, wherein the first connecting part is formed on the first side face of the first light guide plate, the first connecting part has a first connecting face, wherein an lower edge of the opposite end of the first light guide plate corresponding to the first connecting part is recessed to form a light source space; and
   a second light guide plate having a second top face, a second side face, and a second connecting part, wherein the second connecting part is formed on the second side face of the second light guide plate, the second connecting part has a second connecting face;
   wherein the first connecting face and the second connecting face are connected to each other, the first top face and the second top face are coplanar, a distance between the second connecting face and the second top face is $\frac{1}{3}$ to $\frac{1}{20}$ of the thickness of the second light guide plate, wherein an upper face of the second connecting part and the second top face are coplanar, a lower face of the first connecting part and a second bottom face of the second light guide plate are coplanar.

2. The light guide plate assembly of claim 1, wherein the second light guide plate further includes a second upper connecting part and a second lower connecting part, wherein an upper face of the second upper connecting part and the second top face are coplanar, a lower face of the second lower connecting part and a second bottom face of the second light guide plate are coplanar.

3. The light guide plate assembly of claim 1, wherein each connecting face is parallel to the respective top face.

4. The light guide plate assembly of claim 1, wherein the second light guide plate further includes an second upper connecting part and the first light guide plate further includes a first lower connecting part, wherein an upper face of the second upper connecting part and the second top face are coplanar, a lower face of the first lower connecting part and a first bottom face of the first light guide plate are coplanar.

5. The light guide plate assembly of claim 4, wherein the second connecting face of the second upper connecting part is larger than the first connecting face of the first lower connecting part, the first lower connecting part and the side face of the adjacent light guide plates together form a light source space.

6. The light guide plate assembly of claim 5, wherein a light reflecting sheet or a light absorbing sheet is disposed on a first lighting face of the second upper connecting part, the first lighting face faces the light source space.

7. The light guide plate assembly of claim 5, wherein a plurality of V-cut grooves is disposed on a first lighting face of the second upper connecting part, the first lighting face faces the light source space.

8. The light guide plate assembly of claim 1, wherein the second light guide plate further includes an second upper connecting part and the first light guide plate further includes a first lower connecting part, wherein an upper face of the second upper connecting part and the second top face are coplanar, a lower face of the first lower connecting part and a first bottom face of the first light guide plate are parallel to each other with a distance therebetween, the first connecting face of the first lower connecting part is larger than the lower face of the first lower connecting part, the first lower connecting part and the side face of the second light guide plate together form a light source space.

9. The light guide plate assembly of claim 8, wherein a distance between the first connecting face and the lower face of the first lower connecting part is $\frac{1}{3}$ to $\frac{1}{20}$ of the thickness of the first light guide plate.

10. The light guide plate assembly of claim 8, wherein a light reflecting sheet or a light absorbing sheet is disposed on the lower face of the first lower connecting part facing the light source space.

11. The light guide plate assembly of claim 8, wherein a plurality of V-cut grooves is disposed on the lower face of the first lower connecting part facing the light source space.

12. A backlight module for a liquid crystal display panel, comprising:
    a light source; and
    a light guide plate assembly, including:
    a first light guide plate having a first top face, a first side face, and a first connecting part, wherein the first connecting part is formed on the first side face of the first light guide plate, the first connecting part has a first connecting face, wherein an lower edge of the opposite end of the first light guide plate corresponding to the first connecting part is recessed to form a light source space for accommodating the light source; and
    a second light guide plate having a second top face, a second side face, and a second connecting part, wherein the second connecting part is formed on the second side face of the second light guide plate, the second connecting part has a second connecting face;
    wherein the first connecting face and the second connecting face are connected to each other, the first top face and the second top face are coplanar, a distance between the second connecting face and the second top face is $\frac{1}{3}$ to $\frac{1}{20}$ of the thickness of the second light guide plate, wherein an upper face of the second connecting part and the second top face are coplanar, a lower face of the first connecting part and a second bottom face of the second light guide plate are coplanar.

13. The backlight module of claim 12, wherein the second light guide plate further includes a second upper connecting part and a second lower connecting part, wherein an upper face of the second upper connecting part and the second top face are coplanar, a lower face of the second lower connecting part and a second bottom face of the second light guide plate are coplanar.

14. The backlight module of claim 12, wherein each connecting face is parallel to the respective top face.

15. The backlight module of claim 12, wherein the second light guide plate further includes an second upper connecting part and the first light guide plate further includes a first lower connecting part, wherein an upper face of the second upper connecting part and the second top face are coplanar, a lower face of the first lower connecting part and a first bottom face of the first light guide plate are coplanar.

16. The backlight module of claim 15, wherein the second connecting face of the second upper connecting part is larger than the first connecting face of the first lower connecting part, the first lower connecting part and the side face of the adjacent light guide plates together form a light source space for accommodating the light source.

17. The backlight module of claim 16, wherein a light reflecting sheet or a light absorbing sheet is disposed on a first lighting face of the second upper connecting part, the first lighting face faces the light source space.

18. The backlight module of claim 16, wherein a plurality of V-cut grooves is disposed on a first lighting face of the second upper connecting part, the first lighting face faces the light source space.

19. The backlight module of claim 12, wherein the second light guide plate further includes an second upper connecting part and the first light guide plate further includes a first lower connecting part, wherein an upper face of the second upper connecting part and the second top face are coplanar, a lower face of the first lower connecting part and a first bottom face of the first light guide plate are parallel to each other with a distance therebetween, the first connecting face of the first lower connecting part is larger than the lower face of the first lower connecting part, the first lower connecting part and the side face of the second light guide plate together form a light source space for accommodating the light source.

20. The backlight module of claim 19, wherein a distance between the first connecting face and the lower face of the first lower connecting part is $1/3$ to $1/20$ of the thickness of the first light guide plate.

21. The backlight module of claim 19, wherein a light reflecting sheet or a light absorbing sheet is disposed on the lower face of the first lower connecting part facing the light source space.

22. The backlight module of claim 19, wherein a plurality of V-cut grooves is disposed on the lower face of the first lower connecting part facing the light source space.

* * * * *